United States Patent [19]
Brindle et al.

[11] Patent Number: 5,469,534
[45] Date of Patent: Nov. 21, 1995

[54] METHOD FOR TRANSLATING IMAGE PROCESSING DATA

[75] Inventors: Edward E. Brindle; John C. Czudak, both of Webster; David B. Mensing, Hilton, all of N.Y.

[73] Assignee: Xerox Corporation, Stamford, Conn.

[21] Appl. No.: 259,591

[22] Filed: Jun. 14, 1994

[51] Int. Cl.⁶ .................................................. G06K 15/00
[52] U.S. Cl. ........................ 395/114; 395/115; 395/116
[58] Field of Search .................................... 395/114, 117, 395/101, 162

[56] References Cited

U.S. PATENT DOCUMENTS

| | | | |
|---|---|---|---|
| 5,150,455 | 9/1992 | Morikawa et al. | 395/114 |
| 5,226,112 | 7/1993 | Mensing et al. | 395/114 |
| 5,276,799 | 1/1994 | Rivshin | 395/162 |
| 5,293,466 | 3/1994 | Bringmann | 395/114 |
| 5,303,336 | 4/1994 | Kageyama et al. | 395/114 |

*Primary Examiner*—Mark R. Powell
*Assistant Examiner*—Steven P. Sax
*Attorney, Agent, or Firm*—R. Hutter

[57] ABSTRACT

A method of operating an imaging system server, the server being adapted to translate jobs written in a first data form to a second data form, and including a memory defining entry locations therein. Untranslated data relating to the first job is loaded at a first entry location in the memory. The untranslated data relating to the first job is translated, and untranslated data relating to the first job is removed from the memory as the untranslated data is translated. Translated data relating to the first job is loaded at a second entry location in the memory. Untranslated data relating to a second job is loaded at the first entry location in the memory while translating the untranslated data relating to the first job.

3 Claims, 4 Drawing Sheets

FIG. 4
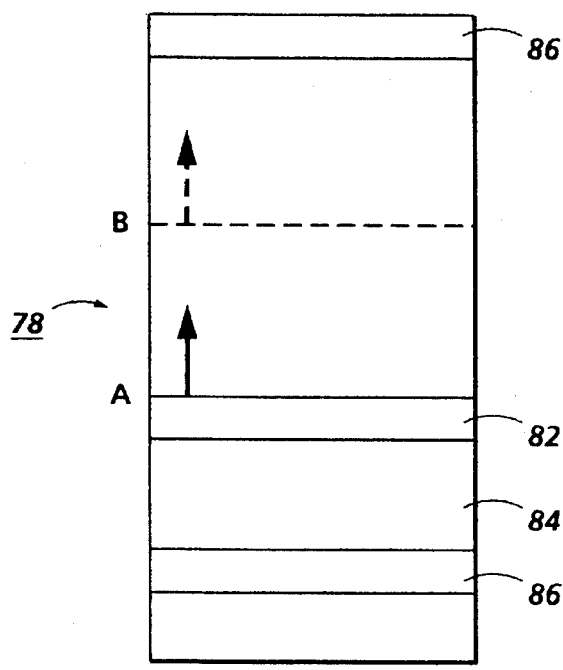
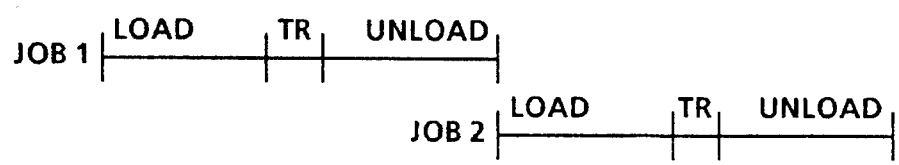
FIG. 5A
*PRIOR ART*
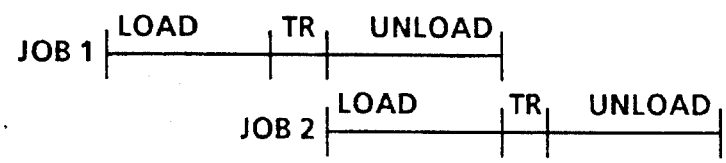
FIG. 5B

METHOD FOR TRANSLATING IMAGE PROCESSING DATA

This application incorporates by reference U.S. Pat. No. 5,226,112, assigned to the assignee hereof.

The present invention relates generally to interpreting jobs written in one of a plurality of page description languages for printing with a printing apparatus, and more particularly to a technique for manipulating image data within a printing apparatus server to optimize the use of multiple interpreters therein.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

In addition to the well-known commercially-available PDLs such as PostScript and HP-PCL, which generally relate mainly to the construction of various type faces, there are other conventions for organizing image data independent of any type faces therein. These "image formats" include TIFF, CALS, as well as those image formats which are associated with facsimile transmission, such as CCITT fax Group 3 and Group 4. Image formats are generally used as a system of "shorthand" commands which enable raw image data (such as a set of binary numbers corresponding to write-black and write-white pixels) into a more compressed and manageable form. To take one basic example, an image format such as TIFF or CALS may include, within a data set, an instruction corresponding to "print a white line" in lieu of outputting a long string of numbers (such as zeros) corresponding to the pixels in the white line. In this way, of course, image data may be retained in smaller memory spaces than would be required if every single pixel in an image had its own bit of memory.

With any PDL or image format, there will inevitably be a step of "translation" of the PDL or image format data into a form usable by an output device, such as a laser printer. Printing hardware requires the stream of binary data which it is the usual function of image formatting to circumvent. Thus, the instructions within the image format, such as to "print a white line," will eventually have to be translated into the actual binary code so that, for example, this code can be applied to the modulation of a laser source in a raster output scanner, or applied sequentially to individual ejectors in an ink-jet printer.

The patent incorporated herein by reference, U.S. Pat. No. 5,226,112, discloses what is generally described as a system for translating data information from one PDL to another PDL, but the basic principle therein can be applied to translating image data directly into the binary code for operating an output device. As described in the patent, the system includes a "server" which includes a host processor, and an "accelerator coprocessor," or ACP. The host processor serves as the main interface between a source of input data (which is in a PDL or an image format) and an output device such as a laser printer. The host periodically addresses the ACP, which is an independent microprocessor with the dedicated function of performing the translation from one data form to another, particularly from one PDL to another or from one PDL to image data. When a job of a particular PDL or image format enters the server, the host processor sends the untranslated data to the ACP, along with the necessary interpretation code for translating the data. Typically, the various interpretation codes for translating various PDLs or image formats are retained on a separate disk memory and retrieved by the host as needed for a particular job. Once the ACP has both the data to be translated and the suitable interpretation code, the translation process is carried out by the ACP otherwise independently of the host. When the translation job is finished, the ACP sends back the translated data to the host, which in turn sends it on to subsequent stages in the image-processing system.

It has been found that a significant bottleneck of productivity with such systems is traceable directly to the fact that the step of transferring data back and forth between the host and the ACP takes a comparable amount of time as the actual translation. The movement of data back and forth between the host and ACP has been found to significantly slow down the entire system. It would therefore be desirable to enable a system wherein the translation step would not have to wait for the complete transference of data into the ACP before it begins.

In accordance with the present invention, there is provided a method of operating an imaging system server, the server being adapted to translate a first job written in a first data form to a second data form and a second job, and including a memory defining entry locations therein. Untranslated data relating to the first job is loaded at a first entry location in the memory. The untranslated data relating to the first job is translated, and untranslated data relating to the first job is removed from the memory as the untranslated data is translated. Translated data relating to the first job is loaded at a second entry location in the memory. Untranslated data relating to the second job is loaded at the first entry location in the memory while translating the untranslated data relating to the first job.

These and other aspects of the invention will become apparent from the following description, the description being used to illustrate a preferred embodiment of the invention when read in conjunction with the accompanying drawings.

FIG. 4 is a schematic view of a memory map capable of being used to interpret a PDL, i.e., a sequence of instructions, employed to translate page description language contained in the job file; and FIGS. 5A and 5B show comparative sets of timelines for the operation of the method of the claimed invention in comparison to the prior art.

Figure 1:
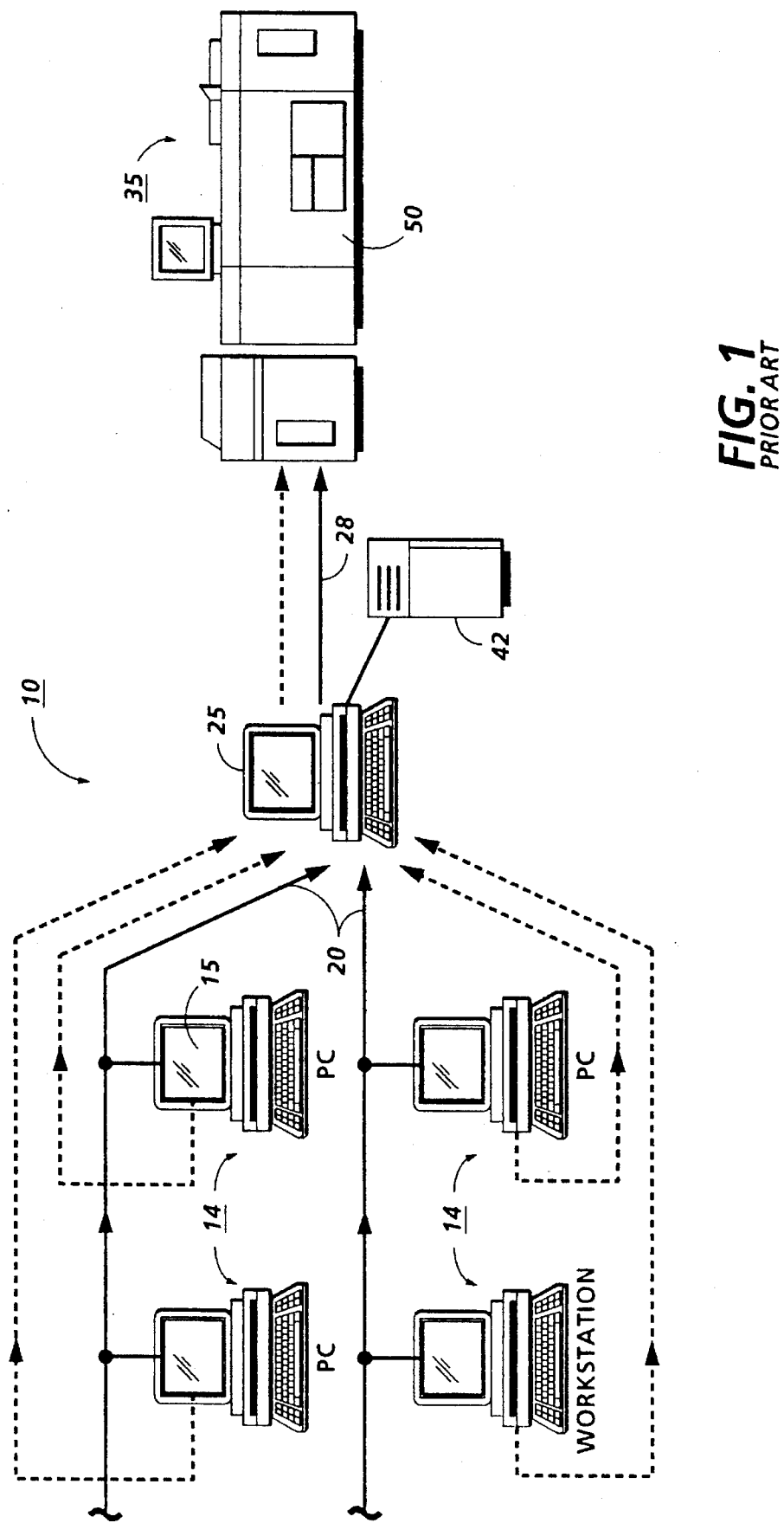
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
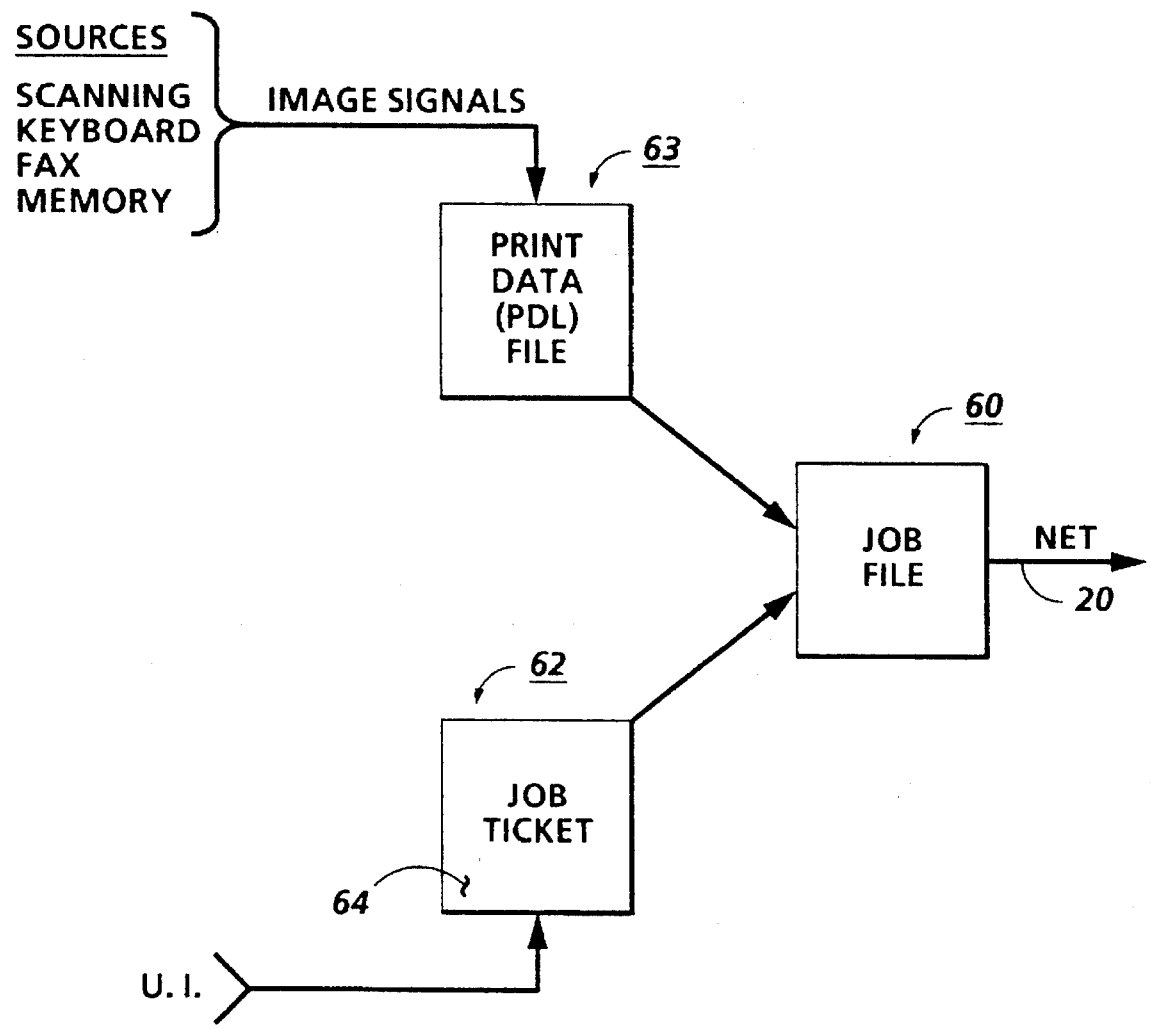
FIG. 2 is a schematic view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a job ticket 64 having instructions for routing, handling, and processing the job 62. As will be clarified from the discussion below, in the preferred embodiment of the present invention, the PDL of print data file 63 is typically written in either Postscript® ("PS") or Hewlett Packard Printer Control Language ("HP-PCL"). The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels, or PDL instructions in Print Data File 63 are arranged as electronic documents or pages for printing on a print media such as paper stock or sheets.

The programming instructions in the job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a job ticket 64 with the program selections available with that printer may be displayed at the client's workstation 14. During the printing process, the server 25 transmits the printing instructions from the job ticket 64 to the printing system selected.

A job ticket 64 comprises a series of electronic program instructions for processing a job. Normally, job ticket 64 consists of an electronic format having various programming choices displayed on screen 15 of the workstation 14 being used to create the job. The client at the workstation interactively fills out the job ticket by making selections electronically using the workstation mouse, keyboard, etc. It should be recognized that the job ticket instructions encompass not only print programming instructions for the job itself but also routing and handling instructions for the server 25. The completed job ticket 64 is combined with the job in Print Data file 63 in the job file 60.

The server 25 comprises any suitable interface for receiving job files 60 from workstations via network 20, with the ability to access and decode the job processing instructions on the accompanying job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 may be provided for this purpose. The printing system 35 may include one or more high speed electronic printers 50 for processing jobs in accordance with the instructions input through the job ticket accompanying each job file. While a single printer 50 is shown, plural printers, either at a single central location or at several remote locations may be envisioned. In contemplated implementations of the preferred embodiment, the printer 50 could comprise printer types such as laser ROS imaging, ink jet, ionographic, LED, and the like.

Figure 3:
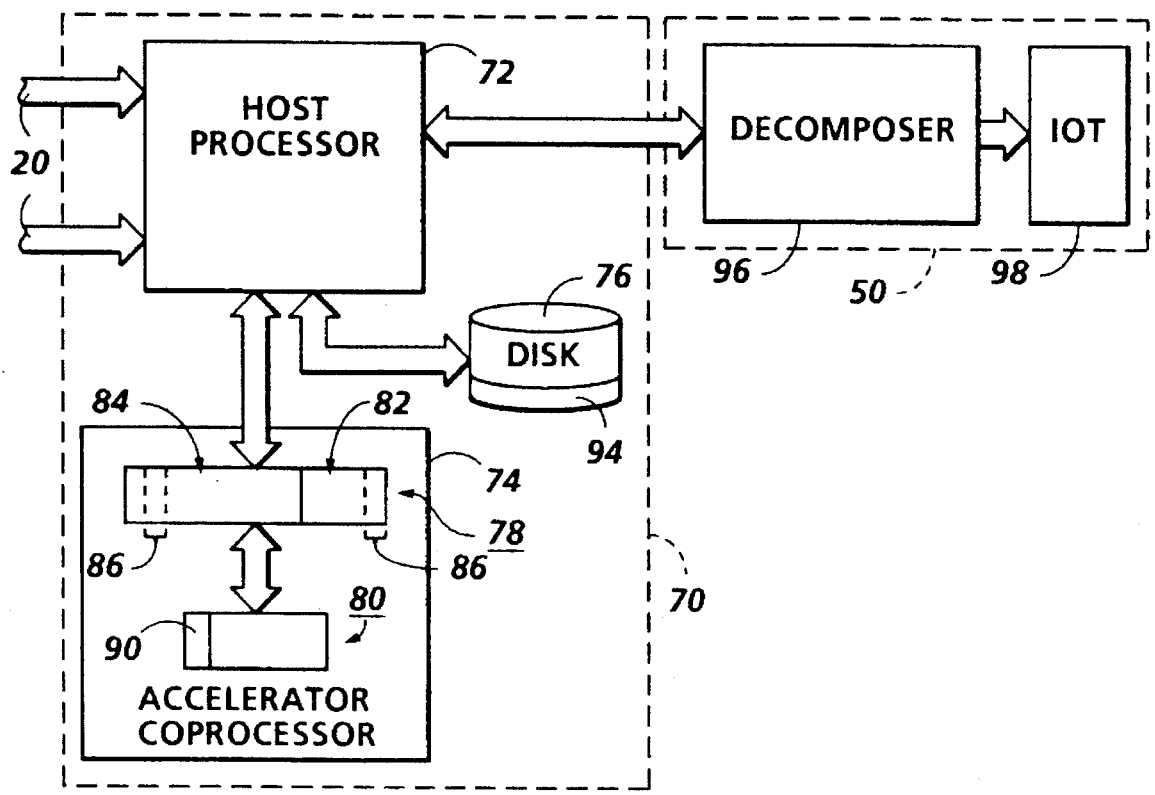
FIG. 3 is a schematic, block diagramatic view of the server and the printing apparatus used to implement the technique of the present invention.

Referring to FIG. 3, the structure of the server 25 and the printing system 35 is discussed in further detail. In the preferred embodiment of the invention, a swapping technique is achieved with an arrangement that is designated by the numeral 70. The arrangement includes a host processor 72, an accelerator coprocessor (ACP) card 74 and a disk storage device 76. In one example, the host processor is an IBM PC-AT system having an Industry Standard Architecture (ISA) or an Extended Industry Standard Architecture (EISA) bus to accept the ACP card. The host processor 72 can be configured for operation in a network environment.

The host processor 72 is coupled with the disk drive device 76 so that, as explained in further detail below, portions of the memory map 78 can be transferred, in the form of a context file, thereto. Preferably, at any one moment, one or more PDL context files, designated by the numeral 94, are stored in the disk drive 76. Upon processing a job file 60, the interpreted PDL file can be transmitted to one of a plurality of output or printing devices. In operating the printer, the interpreted output from the host processor 72 is transmitted to the decomposer 96 where it is decomposed into graphics and text for printing by the IOT 98.

The host processor 72 is capable of transferring data to and from ACP memory through a 128 KB sliding shared memory window, as will be described in detail below. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 72 prior to the actual transfer of PDL decomposer code and font cache data. These two ports are referred to as: the Host to Processor and Processor to Host Data Registers ("HPDR" and "PHDR").

Referring still to FIG. 3, the ACP card 74 is shown with a memory map 78, which includes all of the software necessary to interpret a page description language, and the microprocessor designated by the numeral 80. The memory map 78 includes a section 86 having registers through which the HPDR and the PHDR can communicate and a status flag can be set, as described in the patent incorporated by reference.

The microprocessor 80 includes a section 90 which contains information regarding the internal state of the microprocessor 80, such information including 1K memory, registers and states. This information selectively can be stored in a layer 92 of the system section 84.

The user section 82 comprises a section for retaining PDL interpretation code, the PDL interpretation code being adapted to facilitate the interpretation (i.e., translation) of a job file expressed in a first PDL, such as PS or HP-PCL. In the patent incorporated by reference, the preferred function of the user section 82 was to translate a job file expressed in the first PDL into the "Interpress" language, for purposes of printing the data on Xerox Corporation proprietary machinery. However, in addition to translating data from one PDL to another, the user section 82 can provide interpretation code not only to translate data from one PDL to another, but to translate data of one PDL or image format into a bit stream which may be applied directly to output hardware such as a raster output scanner or ink-jet printhead.

It should be appreciated that only selected portions of the system section 84 are shown. Much of the software for the section 84 simply serves as one of various approaches for implementing the processes generally described in the referenced patent. It will be recognized by those skilled in the art that, in practice, various software tools, such as tables, e.g., fault, system procedure and control tables, timers and controls therefor, control implementations, storage locations, and stacks, typically would be employed in the implementation of the system section 84.

FIG. 4 is a diagram illustrating the division of memory space within the memory map 78, showing how the space within the memory map 78 can be apportioned to carry out an optimized translation technique according to the present invention. In a typical embodiment of a memory map 78, there is typically on the order of 15 MB of space available. Of this space, the system section 84 typically takes up only about 1 KB of space for image formatting, while the interpretation code in section 82 may be comparably small. Therefore, in a practical embodiment of the system, there is typically 14 MB or more of available space for retaining translated and untranslated data.

The function of the improved translation system of the present invention is as follows. First, untranslated data relating to a first job is entered at a predetermined first entry location, such as indicated by A, in the memory map 78. As used in the claims herein, the term "entry location" shall indicate a particular predetermined location within a memory, wherein it is known that a set of data is sequentially started. Thus, in subsequent step, if the data has been placed at a particular entry location, the system would be able to find this data by going first to the entry location and knowing that all of the contiguous data (or until an end-of-job code is detected) belongs to a particular job or file. The untranslated data for a job to be printed is placed in the memory map 78 starting at entry location A and filling up space in the memory as required in one sequential direction within the memory, as shown by the arrow adjacent location A. It will be apparent to one of skill in the art that the entry location A should be placed at a position within the memory map 78 to allow a maximum typical job size to be accommodated by the apportioned section of the memory. Also loaded into memory map 78 at user section 82 is the interpretation code for which instructions passed through the interpretation code from the untranslated data are translated into another data form, such as from TIFF or CALS into bit map form, or alternately from one PDL to another, or any possible combination of data forms which may be required by a particular system. This translation process is carried out by means such as an arithmetic logic unit found in the microprocessor 80 of ACP 74, as described in the patent incorporated by reference.

The data to be translated is taken from the memory map 78 and sent to the relevant portion of the ACP 74, such as microprocessor 80, where the data is converted into the second data form such as binary data. This binary data is then re-loaded back into memory map 78 starting at second entry location such as indicated by B. As translated data is loaded back into memory map 78, the data begins filling the memory starting from the entry location B, as shown by the arrow adjacent the letter B in FIG. 4.

According to the present invention, as untranslated data is removed from memory map 78 starting from entry location A, the untranslated data is effectively erased from its original locations in memory map 78. As successive data of the untranslated data from the first job are removed from entry location A, however, new untranslated data from a second print job is loaded into memory map 78 starting from entry location A. Data from the first job are thus replaced within the memory by data from the second print job.

In the preferred embodiment, the units of removal and replacement within memory map 78 are 128 KB memory blocks. Untranslated data from the first job is removed in 128 KB blocks from memory map 78, and each removed block is substantially immediately replaced with a 128 KB block of untranslated data from the second job; because the 128 KB blocks are sequentially replaced within memory map 78, at one memory location after another, this sequential replacement has the effect of a "sliding shared memory window" starting at each entry location A or B in memory map 78. Thus, instead of a batch process in which one job is loaded and then translated at a time, there is provided the effect of a continuous process, wherein data from the first job is continuously removed from memory map 78, and the positions in memory which are vacated by the data from the first print job are essentially immediately filled by data from the second print job.

As data from the first job is translated elsewhere from the ACP 74 and the translated data, such as in a different PDL or in bitmap form, is loaded back at entry location B in memory map 78, a certain quantity of memory will be taken up when the translated data is finished. However, this translated data at entry location B must then be sent on through the host processor 72 and either temporarily stored in binary form (such as in disk memory 76), or used directly to operate an output device such as a printer. This unloading of the translated data to elsewhere in the system can be performed on a similar continuous basis as was the filling of new untranslated data with the second job at entry location A. In other words, the translated data from the first job, after it is fully loaded into memory map 78 starting at entry location B, can then be removed one line or other unit at a time from the memory map 78, and the vacated locations in memory are replaced with a new stream of translated data resulting from the translation of the second job, thus creating a substantially continuous feed of translated data out of the memory map 78.

There is thus described in the above method, a technique whereby the swap technique of moving translated and untranslated data on and off memory map 78 is changed into a substantially continuous process. Once lines or other subdivisions of data from a first job are removed from one location in the memory map 78, data from a subsequent job substantially immediately replaces the data from the first job at each location. This principle applies both to loading untranslated code initially onto memory map 78, and also to loading translated data on and off the memory map 78. The "replacement" may, depending on the specific design of the memory map 78, merely be a write-over step, in which the entry of data from the second job in a particular location simply covers over data from the first job.

FIGS. 5A and 5B are comparative time lines showing how the method of the present invention serves to speed up the translation (and thereby the output) of a plurality of jobs to be printed. In FIG. 5A is shown a time line of events when two jobs are processed through an apparatus such as in FIG. 3, without benefit of the system of the present invention. The top time line relates to a first job to be printed, and the lower time line relates to a second job to be printed. As can be seen in FIG. 5A, the first job must be loaded, translated, and then unloaded from the memory map 78, before the second job represented by the lower time line, can even get into the memory map 78. In FIG. 5B is shown timelines, once again relating to a first job in the top time line and a second job in the lower time line, showing how the loading of the second job can begin immediately after the translation of the first job begins. The system of the present invention thus permits a significant overlap of function performed by the server. The relative lengths of the loading, unloading, and translation steps shown in FIGS. 5A and 5B are generally accurate for common devices. When a long sequence of jobs are queued into a server, the long-term time savings will be extremely significant.

The present invention could conceivably be combined with a system in which successive jobs are translated by different memory maps, such as in the case where jobs of different image formats and/or PDLs are sequentially loaded into the server.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

We claim:

1. A method of operating an imaging system server having processing means, the server being adapted to translate a first job written in a first data form to a second data form and a second job, and including a memory defining entry locations therein, comprising the steps of:

loading untranslated data relating to the first job at a first entry location in the memory;

translating the untranslated data relating to the first job;

sequentially removing a series of blocks of untranslated data relating to the first job from the memory as the untranslated data is translated, each block being of a predetermined size;

loading translated data relating to the first job at a second entry location in the memory; and sequentially loading a series of blocks of untranslated data relating to the second job at the first entry location in the memory, each block being of the predetermined size, each block of untranslated data relating to the second job replacing a removed block of untranslated data relating to the first job in an identical location in the memory, with blocks of untranslated data relating to the first job and blocks of untranslated data relating to the second job being retained in the memory simultaneously.

2. The method of claim 1, further comprising the steps of:

unloading translated data from the first job from the second entry location in the memory;

translating the untranslated data relating to the second job; and loading translated data relating to the second job at the second entry location in the memory.

3. The method of claim 2, further comprising the step of replacing translated data blocks of predetermined size relating to the first job with translated data blocks relating to the second job in the memory.

\* \* \* \* \*